3,455,938
CERTAIN DI-LOWERALKOXY PHOSPHINO-THIO-
(AND DI-THIO) POLY HALO PYRIDYL ACETATES
Etcyl H. Blair, Midland, Mich., and Bryant C. Fischback,
 Walnut Creek, Calif., assignors to The Dow Chemical
 Company, Midland, Mich., a corporation of Delaware
No Drawing. Filed Dec. 22, 1966, Ser. No. 603,764
 Int. Cl. C07d 105/02, 31/48; A01n 9/36
U.S. Cl. 260—294.8          5 Claims

ABSTRACT OF THE DISCLOSURE

The present invention is directed to novel pyridyl (phosphinylthio)acetate products of the formula:

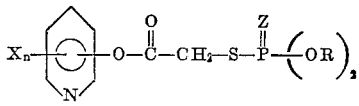

In the above and succeeding formula, R represents loweralkyl, Z represents oxygen or sulfur, each X independently represents bromo or chloro, and $n$ represents an integer of from 2 to 4, both inclusive. In the present specification and claims, the term "loweralkyl" is employed to designate alkyl radicals being of from 1 to 4, both inclusive, carbon atoms. The products of the present invention are useful as agents to kill and/or to inhibit the growth of plants of all kinds, including higher plants such as pigweeds, crabgrass, German millet, Sudan grass, beans, wild oats, and meadow fescue, as well as fungi and bacteria such as *Trichophyton mentagrophytes, Salmonella typhosa, Staphylococcus aureus, Pullularia pullulans, Rhizopus nigricans, Pseudomanas aeruginosa*, and rice blast. In addition, the products are useful as agents to control insect and mite pests such as the two-spotted spider mite, housefly, bean aphid, and the like, and as anthelminthics.

Detailed description of the invention

The pyridyl (phosphinylthio)acetate products of the present invention:

I
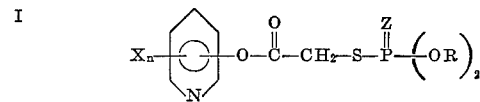

are liquids or crystalline solids at room temperature, more typically the former. They are of low solubility in water and of low to moderate solubility in organic solvents. They are prepared by reaction of a pyridyl chloroacetate of the formula:

II
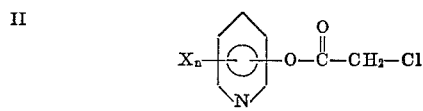

with a dialkyl phosphorothioate salt of the formula

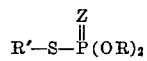

where R′ is preferably sodium, potassium or ammonium. The reaction is conveniently carried out in the presence of an inert liquid reaction medium, typically an organic liquid. The identity of such liquid, if employed, is not critical; suitable liquids include the ethers, such as diethyl ether and tetrahydrofuran; the hydrocarbons, such as hexane, benzene, and cyclohexane; and ketones, such as acetone and methyl isopropyl ketone. The reaction consumes the pyridyl chloroacetate and the dialkyl phosphorothioate salt in amounts representing equimolecular proportions, and the use of such amounts is preferred.

The reaction goes forward under temperatures of from 0° to 50° C., but is conveniently and preferably conducted at room temperature. The reaction results in the preparation of the desired product and of R′Cl byproduct.

In carrying out the reaction, the pyridyl chloroacetate and dialkyl phosphorothioate salt are contacted, conveniently by adding one to other in a reaction medium. The reaction goes forward readily upon the contracting of the reactants. However, it is sometimes preferred that the reaction mixture be permitted to stand for a period of time to insure completion of the reaction. When employing an organic liquid as a reaction medium, in the preferred practice, the by-product appears as a precipitate in the reaction mixture and is conveniently separated by filtration. The reaction medium is removed in conventional procedures, typically by evaporation under subatmospheric pressures. The separated product thus obtained can be employed directly or can be purified before being so employed.

The following examples illustrate the preparation of the products of the present invention and will enable those skilled in the art to practice the same.

EXAMPLE 1.—(3,5,6 - TRICHLORO - 2 - PYRIDYL) (DIETHOXYPHOSPHINOTHIOYLTHIO)ACETATE

Sodium O,O-diethyl phosphorodithioate (20.8 grams; 0.1 mole) was dissolved in 125 milliliters of distilled dry acetone and (3,5,6-trichloro-2-pyridyl) chloroacetate (27.5 grams; 0.1 mole) added. These operations were carried out at room temperature. Sodium chloride began immediately to deposit. After stirring for four hours at room temperature, the reaction mixture was filtered to remove sodium chloride, and the filtrate evaporated under subatmospheric pressure to remove the acetone. The residue, an oil plus a small amount of solid, was stored overnight. More solid had deposited. The solid was separated by filtration on a medium sintered-glass funnel, dissolved in about 350 milliliters of warm hexane, chilled to 0° C., and the solid which reprecipated filtered off. This solid was 3,5,6-trichloro-2-pyridinol and was discarded. The hexane filtrate was evaporated to dryness to separate the desired (3,5,6-trichloro-2-pyridyl) (diethoxyphosphinothioylthio) acetate product as a residue. This product residue was crystallized by cooling over Dry Ice. It melted at 38–41° C. and weighed 16.55 grams (39.0% yield). The oil filtrate from the original acetone evaporation was dissolved in hexane and the insoluble portion separated by filtration and subsequently discarded. The filtrate was washed with aqueous sodium bicarbonate solution, then washed with water, dried over anhydrous magnesium sulfate, and filtered. Hexane was removed from the filtrate under subatmospheric pressure and the resulting oil crystallized over Dry Ice to yield a further portion of the (3,5,6-trichloro-2-pyridyl) (diethoxyphosphinothioylthio)acetate product. This portion of product was 13.45 grams (31.7% yield) and melted at 39.0–42.0° C.

Analysis gave Cl, 24.3; N, 3.21; S, 15.7. Theory yield requires Cl, 25.1; N, 3.31; S, 15.1.

Other products prepared in accordance with the foregoing teachings and example include the following:

EXAMPLES 2–10

From (3,5-dichloro-2-pyridyl) chloroacetate and sodium O,O-diethyl phosphorodithioate, (3,5-dichloro-2-pyridyl) (diethoxyphosphinothioylthio)acetate, a viscous liquid.

From (2,4,6-tribromo-3-pyridyl) chloroacetate and sodium O,O-diethyl phosphorodithioate, (2,4,6-tribromo-3-ridyl) (diethoxyphosphinothioylthio)acetate, a viscous liquid.

From (2,3,5-trichloro-4-pyridyl) chloroacetate and sodium O,O-diethyl phosphorodithioate, (2,3,5-trichloro-4-pyridyl) (diethoxyphosphinothioylthio)acetate, a liquid.

From (2,3,5,6-tetrachloro-4-pyridyl) chloroacetate and sodium O,O-diethyl phosphorodithioate, (2,3,5,6-tetrachloro-4-pyridyl) (diethoxyphosphinothioylthio)acetate, a liquid.

From (5,6-dibromo-2-pyridyl) chloroacetate and sodium O,O-di-n-butyl phosphorodithioate, (5,6-dibromo-2-pyridyl) (di-n-butoxyphosphinothioylthio)acetate, m.w. 535.3.

From (3.5,6-trichloro-2-pyridyl) chloroacetate and sodium O,O-dimethyl phosphorodithioate, (3,5,6-trichloro-2-pyridyl) (dimethoxyphosphinothioylthio)acetate, a viscous liquid.

From (3,5-dichloro-2-pyridyl) chloroacetate and S-sodium O,O-diethyl phosphorothioate, (3,5-dichloro-2-pyridyl) (diethoxyphosphinylthio)acetate, m.w. 374.2.

From (3,5-dibromo-4,6-dichloro-2-pyridyl) chloroacetate and sodium O,O-diethyl phosphorodithioate, (3,5-dibromo-4,6-dichloro-2-pyridyl) (diethoxyphosphinothioylthio)acetate, a liquid.

From (2,4,6-tribromo-3-pyridyl) chloroacetate and S-sodium O,O-di-n-propyl phosphorothioate, (2,4,6-tribromo - 3-pyridyl) (di-n-propoxyphosphinylthio)acetate, m.w. 570.1.

The identity of the foregoing products is confirmed by element analysis.

When a product of the present invention is employed for its biological activities, the unmodified substance can be utilized. However, the present invention also encompasses the utilization of the substance together with an adjuvant. For example, the substance can be dispersed on a finely divided solid and the resulting preparation employed as a dust. Also, a product of the present invention, or a composition comprising the same and a finely divided solid, can be dispersed in water with the aid of a wetting agent and the resulting aqueous suspension employed as a spray. In other procedures, a product according to the present invention can be employed as the constituent of organic liquid compositions, oil-in-water or water-in-oil emulsions, or water dispersions, with or without the addition of a wetting, dispersing, or emulsifying agent.

In representative operations, an aqueous formulation containing as sole active agent 200 parts of (2,3,5,6-tetrachloro-4 - pyridyl) (diethoxyphosphinothioylthio)acetate per million parts by weight of total composition gave 100 percent kill and control of the crabgrass plants to which the formulation was applied as a spray.

The pyridyl chloroacetate compounds to be employed as starting materials in preparing the products of the present invention are themselves prepared by conventional procedures which comprise the reaction of a pyridinol of the formula

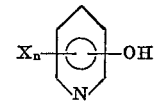

with chloroacetyl chloride. Good results are obtained when operating at temperatures of from 50° to 100° C. The reaction consumes the pyridinol and chloroacetyl chloride in amounts representing equimolecular amounts, but inasmuch as chloroacetyl chloride is a liquid, it is generally preferred to use an excess of chloroacetyl chloride, such as from 2 to 10 molecular proportions of chloroacetyl chloride per molecular proportion of the pyridinol.

We claim:
1. Compound of the formula

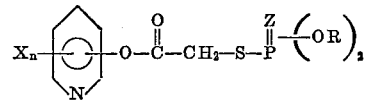

wherein R represents loweralkyl, Z represents oxygen or sulfur, each X independently represents bromo or chloro, and $n$ represents an integer of from 2 to 4, both inclusive.

2. The compound of claim 1 wherein R represents ethyl or n-propyl and Z represents sulfur.

3. The compound of claim 2 wherein $X_n$ represents 3,5-dichloro- or 3,5-dibromo-substitution.

4. The compound of claim 2 wherein $X_n$ represents 3,5,6-trichloro- or 2,4,6-tribromo-substitution.

5. The compound of claim 2 which is (2,3,5,6-tetrachloro-4-pyridyl) (diethoxyphosphinothioylthio)acetate or (3,5,6-trichloro-2-pyridyl) (diethoxyphosphinothioylthio) acetate.

References Cited

Chemical Abstracts, vol. 64 par. 8152-(f,g) 1966.

HENRY R. JILES, Primary Examiner

ALAN L. ROTMAN, Assistant Examiner

U.S. Cl. X.R.

71—94; 260—999